(12) United States Patent
Shinde et al.

(10) Patent No.: US 11,913,376 B2
(45) Date of Patent: Feb. 27, 2024

(54) PRESSURIZED AIRFLOW TO ROTATE COMPRESSOR DURING ENGINE SHUTDOWN

(71) Applicant: General Electric Company, Schenectady, NY (US)

(72) Inventors: Kudum Shinde, Bengaluru (IN); Ravindra Shankar Ganiger, Bengaluru (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/663,308

(22) Filed: May 13, 2022

(65) Prior Publication Data

US 2023/0220799 A1 Jul. 13, 2023

(30) Foreign Application Priority Data

Jan. 11, 2022 (IN) .............................. 202211001497

(51) Int. Cl.
  *F02C 7/18* (2006.01)
  *F01D 21/00* (2006.01)
  (Continued)

(52) U.S. Cl.
  CPC .................. *F02C 3/04* (2013.01); *F01D 5/06* (2013.01); *F01D 21/00* (2013.01); *F01D 25/34* (2013.01);
  (Continued)

(58) Field of Classification Search
  CPC . F01D 5/06; F01D 19/00; F01D 19/02; F01D 25/34; F01D 21/00; F02C 7/18; F02C 7/32; F04D 29/321; F05D 2240/60
  See application file for complete search history.

(56) References Cited

U.S. PATENT DOCUMENTS 4,880,354 A * 11/1989 Teranishi ................ F01D 25/10
    416/198 A
9,810,158 B2  11/2017 Foutch et al.
    (Continued)

FOREIGN PATENT DOCUMENTS

EP  3399157 B1  8/2021
EP  3901440 A1  10/2021
JP  2005264788 A * 9/2005 ............... F01D 5/08

OTHER PUBLICATIONS

English translation of JP 2005264788 (Year: 2005).*

*Primary Examiner* — Scott J Walthour
(74) *Attorney, Agent, or Firm* — Venable LLP; Edward Kmett; Michele V. Frank

(57) ABSTRACT

A gas turbine engine includes a compressor section with a compressor rotor shaft assembly including a plurality of compressor rotors longitudinally spaced apart from each other via respective ones of a plurality of shaft sections of a rotor shaft, each compressor rotor of the plurality of compressor rotors having a plurality of rotor vanes extending radially outward therefrom and being circumferentially spaced about the compressor rotor. A stator shroud assembly has a stator shroud casing surrounding the compressor rotor shaft assembly, a compressor flow passage being defined between the compressor rotor shaft assembly and the stator shroud casing. A pressurized air source generates a flow of pressurized air to be provided to the compressor section, and a plurality of pressurized airflow nozzles are connected with the pressurized air source and provide the flow of pressurized air into the compressor flow passage to cause the compressor rotor shaft assembly to rotate.

19 Claims, 10 Drawing Sheets

(51) Int. Cl.
*F01D 25/34* (2006.01)
*F02C 3/04* (2006.01)
*F04D 29/32* (2006.01)
*F02C 7/32* (2006.01)
*F02C 7/36* (2006.01)
*F01D 5/06* (2006.01)

(52) U.S. Cl.
CPC ................ *F02C 7/18* (2013.01); *F02C 7/32* (2013.01); *F02C 7/36* (2013.01); *F04D 29/321* (2013.01); *F05D 2220/323* (2013.01); *F05D 2240/35* (2013.01); *F05D 2240/60* (2013.01)

(56) References Cited

U.S. PATENT DOCUMENTS

| | | |
|---|---|---|
| 10,125,636 B2 | 11/2018 | Dube et al. |
| 10,443,507 B2 | 10/2019 | Schwarz et al. |
| 10,753,225 B2 | 8/2020 | Karnofski et al. |
| 10,760,498 B2 | 9/2020 | Cannella et al. |
| 10,927,757 B2 | 2/2021 | Stevenson |
| 10,954,865 B2 | 3/2021 | Mackin |
| 2016/0368614 A1* | 12/2016 | Endres ...................... F02C 9/18 |
| 2019/0323426 A1* | 10/2019 | Mackin .................. B64D 27/10 |

* cited by examiner

PRESSURIZED AIRFLOW TO ROTATE COMPRESSOR DURING ENGINE SHUTDOWN

CROSS REFERENCE TO RELATED APPLICATIONS

The present application claims the benefit of Indian Patent Application No. 202211001497, filed on Jan. 11, 2022, which is hereby incorporated by reference herein in its entirety.

TECHNICAL FIELD

The present disclosure relates to a pressurized airflow to rotate a compressor during engine shutdown. More particularly, the present disclosure provides a system that injects a pressurized airflow into a compressor section of a gas turbine engine to rotate and to cool the compressor rotors during engine shutdown to mitigate a bowed-rotor condition.

BACKGROUND

Conventionally, when a turbine engine is shut down, due to high temperatures within the core engine, heat stratifies in the engine core. In a compressor, and, more particular, within a high pressure compressor, the tops of the compressor rotors tend to become hotter than the bottom of the compressor rotors due to rising heat within the compressor section, which leads to asymmetrical thermal expansion between the top of the compressor rotors and the bottom of the compressor rotors. This can lead to a bowed-rotor condition in which, when the upper part of the rotor is rotated to the lower part of the surrounding engine casing, the upper part of the rotor may contact the lower part of the casing, which has not radially expanded as much as the upper part of the engine casing. Repeated contact or rubbing with the engine casing during rotation of the compressor rotor during the next engine startup with a bowed-rotor condition may cause damage to the engine.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
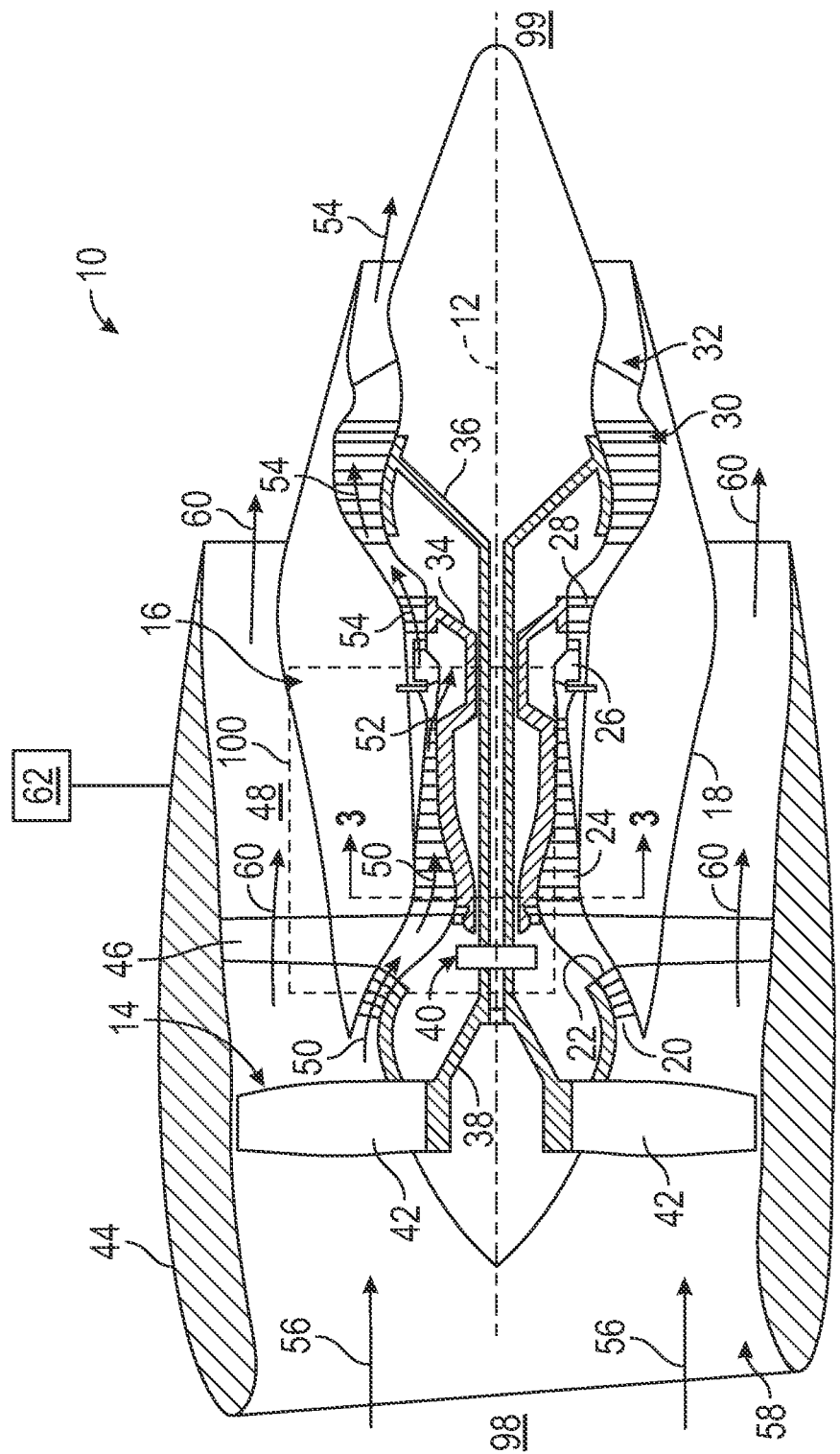
FIG. 1 is a schematic partial cross-sectional side view of an exemplary high by-pass turbofan jet engine, according to an aspect of the present disclosure.

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Conventionally, when a turbine engine is shut down, due to high temperatures within the core engine, heat stratifies in the engine core. In a compressor, and, more particular, within a high pressure compressor, the tops of the compressor rotors tend to become hotter than the bottom of the compressor rotors due to rising heat within the compressor section. The stratification can often lead to as much as a 500° C. difference between the top of the compressor rotors and the bottom of the compressor rotors, which leads to asymmetrical thermal expansion between the top of the compressor rotors and the bottom of the compressor rotors. In this case, the top of the compressor rotor thermally expands a greater radial amount than the bottom of the compressor rotor, causing what is referred to as a bowed-rotor condition. The bowed-rotor condition may occur within ten minutes of the engine being turned off and may last up to eight hours. The thermal expansion may be great enough that, when the upper part of the rotor is rotated to the lower part of the surrounding engine casing, the upper part of the rotor may contact the lower part of the casing, which has not radially expanded as much as the upper part of the engine casing.

Repeated contact or rubbing with the engine casing during rotation of the compressor rotor during the next engine startup with a bowed-rotor condition may cause damage to the engine.

The present disclosure addresses the foregoing by providing an air-assisted bowed-rotor mitigation system that injects a flow of pressurized air into the compressor section during engine shutdown to mitigate the bowed-rotor condition. More specifically, during the engine shutdown phase, a pressurized air source, either within the engine or external to the engine, provides a flow of pressurized air through a duct system connected with a plurality of pressurized airflow nozzles. The plurality of pressurized airflow nozzles may extend through a compressor stator shroud, or may be incorporated into stator vanes, and direct the flow of pressurized air onto rotor vanes of the compressor rotor shaft assembly, thereby causing the compressor rotor shaft assembly to rotate. In another aspect, a reverse bleed flow of the pressurized air may be provided to a cavity within the compressor rotor shaft to pressurize the cavity. The compressor rotor shaft includes a plurality of pressurized airflow nozzles therethrough that provide a tangential flow of the pressurized air into the compressor flow passage so as to generate torque and to rotate the compressor rotor shaft assembly. The rotation of the compressor rotor shaft assembly during the shutdown phase provides for a more uniform cooling of the compressor rotors, thereby mitigating the possibility of a bowed-rotor condition.

Referring now to the drawings, FIG. 1 is a schematic partial cross-sectional side view of an exemplary high by-pass turbofan jet engine 10, herein referred to as "engine 10," as may incorporate various embodiments of the present disclosure. Although further described below with reference to a turbofan engine, the present disclosure is also applicable to turbomachinery in general, including turbojet, turboprop, and turboshaft gas turbine engines, including marine and industrial turbine engines and auxiliary power units. As shown in FIG. 1, engine 10 has a longitudinal centerline axis 12 that extends therethrough from an upstream end 98 of the engine 10 to a downstream end 99 of the engine 10 for reference purposes. In general, engine 10 may include a fan assembly 14 and a core engine 16 disposed downstream from the fan assembly 14.

The core engine 16 may generally include a core engine outer casing 18 that defines an annular inlet 20. The core engine outer casing 18 encases, in serial flow relationship, a compressor section (22/24) having a booster or a low pressure (LP) compressor 22 and a high pressure (HP) compressor 24, a combustor 26, a turbine section (28/30) including a high pressure (HP) turbine 28 and a low pressure (LP) turbine 30, and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40, such as in an indirect-drive configuration or a geared-drive configuration. In other embodiments, although not illustrated, the engine 10 may further include an intermediate pressure (IP) compressor and a turbine rotatable with an intermediate pressure shaft.

As shown in FIG. 1, the fan assembly 14 includes a plurality of fan blades 42 that are coupled to, and extend radially outwardly from, the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially spaced outlet guide vanes or struts 46. Moreover, at least a portion of the nacelle 44 may extend over an outer portion of the core engine 16 so as to define a bypass airflow passage 48 therebetween.

In operation, air 56 enters the nacelle 44 at a nacelle inlet 58, and a portion of the air 56 enters the compressor section (22/24) as a compressor inlet air flow 50, where it is compressed to generate compressed air 52. Another portion of the air 56 enters the bypass airflow passage 48, thereby providing a bypass airflow 60. The compressed air 52 from the compressor section (22/24) enters the combustor 26, where the compressed air 52 is mixed with fuel that is then ignited and burned to generate combustion gases 54. The combustion gases 54 pass through the HP turbine 28 and then the LP turbine 30, thereby driving the HP compressor 24 and the LP compressor 22. Finally, the combustion gases 54 pass through the jet exhaust nozzle section 32 to provide thrust.

Operation of the engine 10 may be controlled in whole or in part by an electronic engine controller, shown schematically at 62. One example of such a controller 62 is a full authority digital engine control ("FADEC"). The controller 62 may be mounted in any convenient location or in the engine 10, including, but not limited to, within a fan nacelle, or within the core engine 16.

Figure 2:
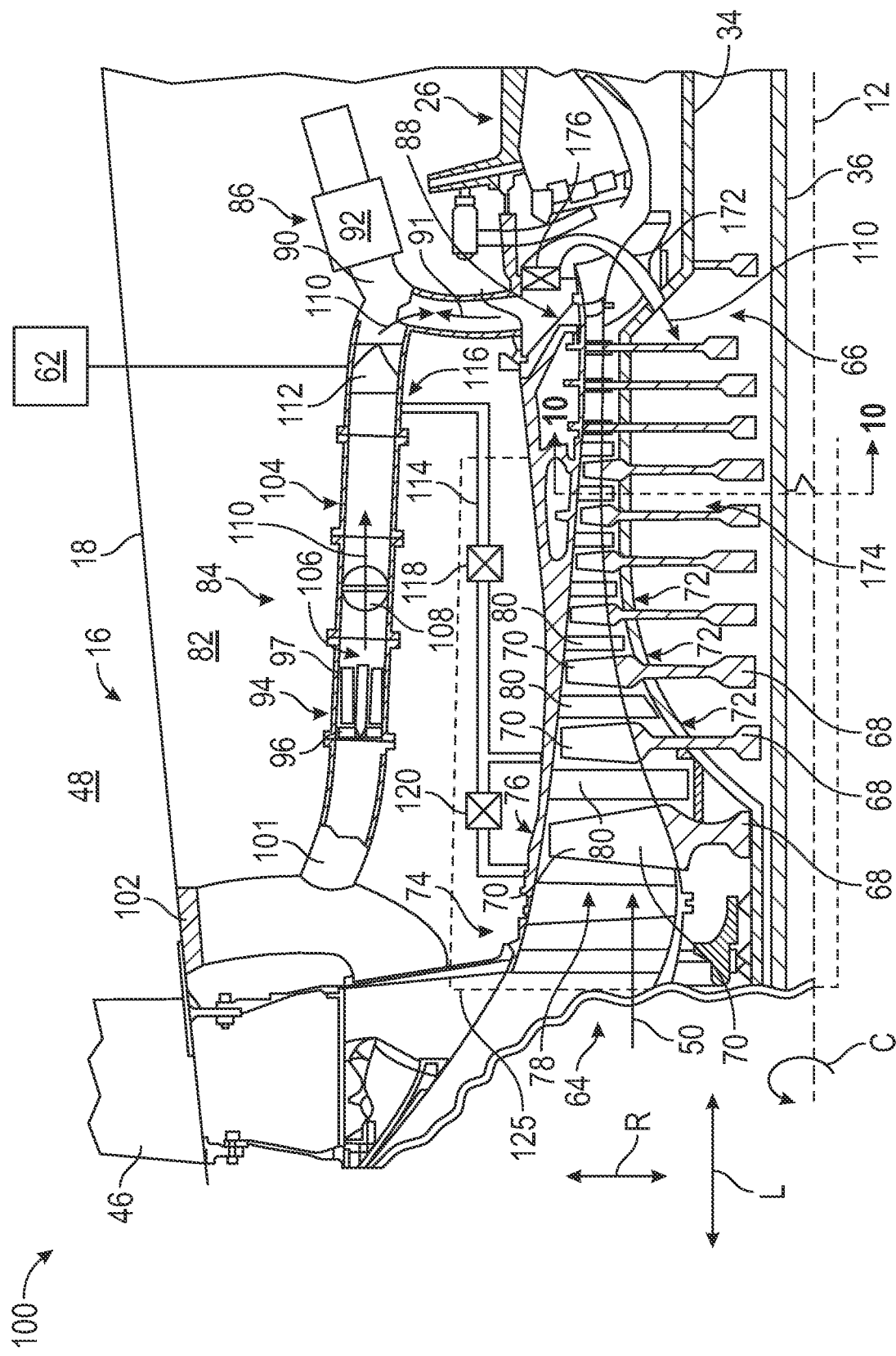
FIG. 2 is a partial cross-sectional side view of a forward portion of the core engine, taken at detail view 100 of FIG. 1, according to an aspect of the present disclosure.
Figure 3:
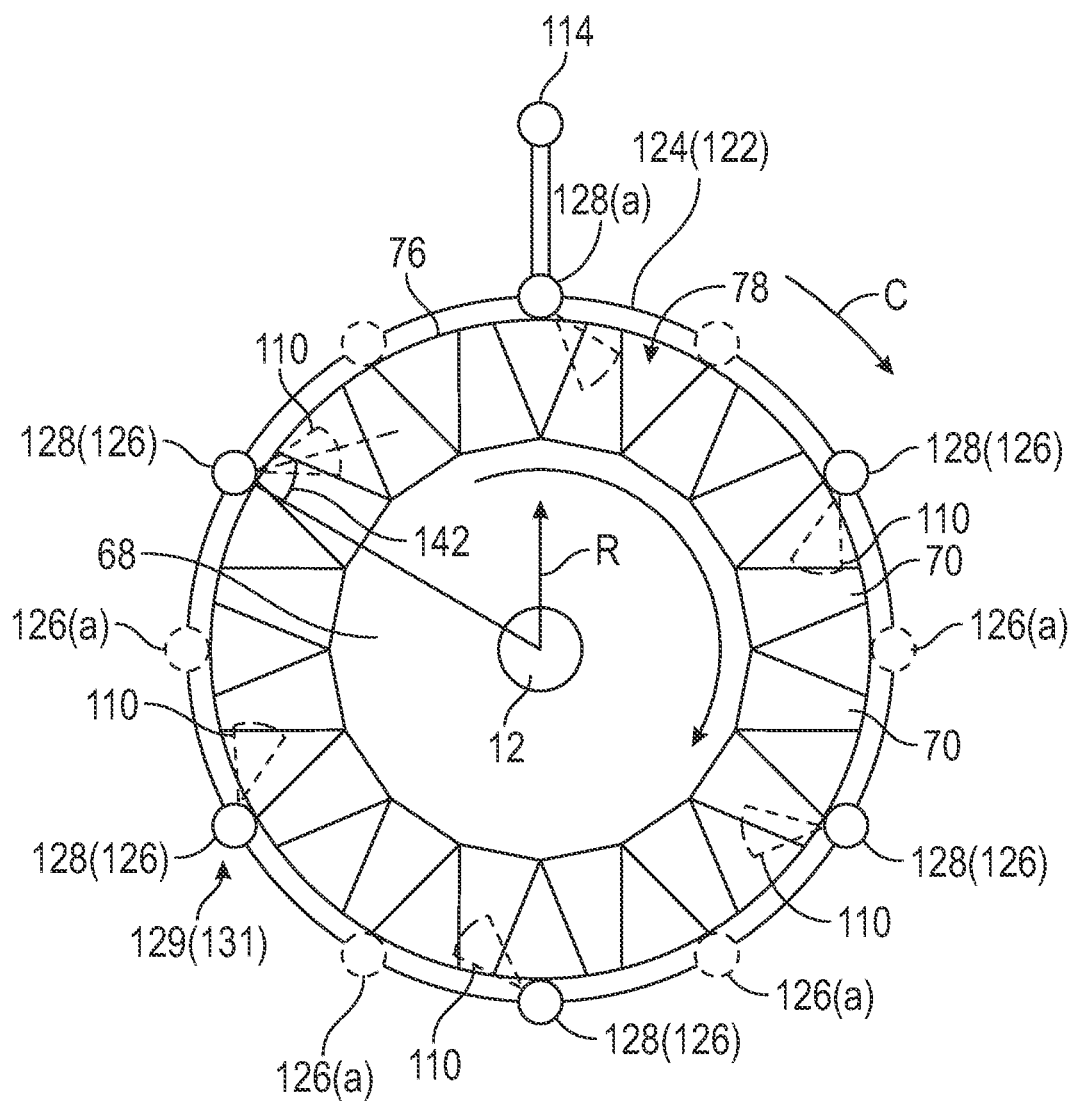
FIG. 3 is a schematic aft-looking view of a compressor rotor taken at plane 3-3 of FIG. 1, according to an aspect of the present disclosure.

FIG. 2 is a partial cross-sectional side view of a forward portion of the core engine 16, taken at detail view 100 of FIG. 1, according to an aspect of the present disclosure. In FIG. 2, the gas turbine engine 10 includes a compressor section 64, which may correspond to the high pressure (HP) compressor 24 of FIG. 1. The compressor section 64 includes a compressor rotor shaft assembly 66 that may incorporate the high pressure (HP) rotor shaft 34, and a plurality of compressor rotors 68. In FIG. 2, only three compressor rotors 68 are labeled, but as can readily be seen in FIG. 2, as many as ten compressor rotors may be provided in the compressor rotor shaft assembly 66. The compressor rotors 68 are longitudinally spaced apart from each other in a longitudinal direction (L) via respective ones of a plurality of rotor shaft sections 72. The rotor shaft sections 72 arranged between respective compressor rotors 68 may be joined to the respective compressor rotors 68 via, for example, being bolted together. Each compressor rotor 68 of the plurality of compressor rotors 68 has a plurality of compressor rotor vanes 70 extending radially outward therefrom in a radial direction (R). Referring briefly to FIG. 3, which is a schematic aft-looking view of a compressor rotor 68 taken at plane 3-3 of FIG. 1, it can be seen that the plurality of compressor rotor vanes 70 are circumferentially spaced about the compressor rotor 68.

Referring back to FIG. 2, the compressor section 64 is further seen to include a stator shroud assembly 74 that includes a stator shroud casing 76 that extends circumferentially about the longitudinal centerline axis 12 and that surrounds the compressor rotor shaft assembly 66. A compressor flow passage 78 is defined between the compressor rotor shaft assembly 66 and the stator shroud casing 76. In the exemplary compressor section 64 of FIG. 2, an axial flow compressor is depicted in which the compressor inlet air flow 50 generally flows through the compressor section 64 in the longitudinal (axial) direction (L) with respect to the longitudinal centerline axis 12. The stator shroud assembly 74 further includes a plurality of stator vanes 80 that extend radially inward from the stator shroud casing 76. The plurality of stator vanes 80, as will be described in more detail below, are circumferentially spaced apart from one another about the stator shroud casing 76 and are provided between respective ones of the plurality of compressor rotors 68.

The core engine outer casing 18 (see also, FIG. 1), as it relates to the compressor section 64, is arranged radially outward of the stator shroud casing 76 and defines an underspace 82 between the core engine outer casing 18 and the stator shroud casing 76. Provided within the underspace 82 is an air-assisted bowed-rotor mitigation system 84. The air-assisted bowed-rotor mitigation system 84 may be incorporated with a compressor bleed air system 86, which is well known in the art. More specifically, the compressor bleed air system 86 is generally known to include a compressor bleed port 88 that is connected with a compressor bleed air duct 90 having a bleed valve 92 within the compressor bleed air duct 90. The compressor bleed air system 86 provides a flow of bleed air 91 from the high pressure compressor 24 for use in, for example, an aircraft environmental control system. On the other hand, the air-assisted bowed-rotor mitigation system 84 may be a reverse bleed system that, as will be described below, provides an airflow into the compressor section 64 to turn the compressor rotor shaft assembly 66 in order to mitigate a bowed-rotor condition of the plurality of compressor rotors 68.

The air-assisted bowed-rotor mitigation system 84 includes a pressurized air source 94, which may be an air pump having an impeller 96 and a motor 97 that drives the impeller 96. The pressurized air source 94 may be connected to the controller 62 for turning the motor 97 on and off, and/or for controlling a speed of the motor 97. The air-assisted bowed-rotor mitigation system 84 includes an air ducting system 103 that has an air intake duct 101 that is connected to an inlet 102 through the core engine outer casing 18 and is connected to the pressurized air source 94. A pressurized air duct 104 is connected to an outlet side 106 of the pressurized air source. The pressurized air duct 104 includes a valve 108 to control a flow of pressurized air 110 generated by the pressurized air source 94 to the pressurized air duct 104. The valve 108 may be connected to, and controlled by, the controller 62. Downstream of the valve 108, connected in the pressurized air duct 104, is a valve 112. The valve 112 may be controlled by the controller 62 and to permit the flow of pressurized air 110 to pass therethrough into the compressor bleed air duct 90. The valve 112 may also prevent the compressor bleed air 91 from flowing back into the pressurized air duct 104.

Branching off of the pressurized air duct 104 is an air-assist nozzle duct 114. An inlet 116 of the air-assist nozzle duct 114 may be connected to the pressurized air duct 104 downstream of the valve 108 and upstream of the valve 112 so that, when the valve 108 is opened and the pressurized air source 94 is operational to generate the pressurized air 110, and the valve 112 is closed, the pressurized air 110 flows into the air-assist nozzle duct 114. A valve 118 and a valve 120 are seen to be included in the air-assist nozzle duct 114.

Figure 4:
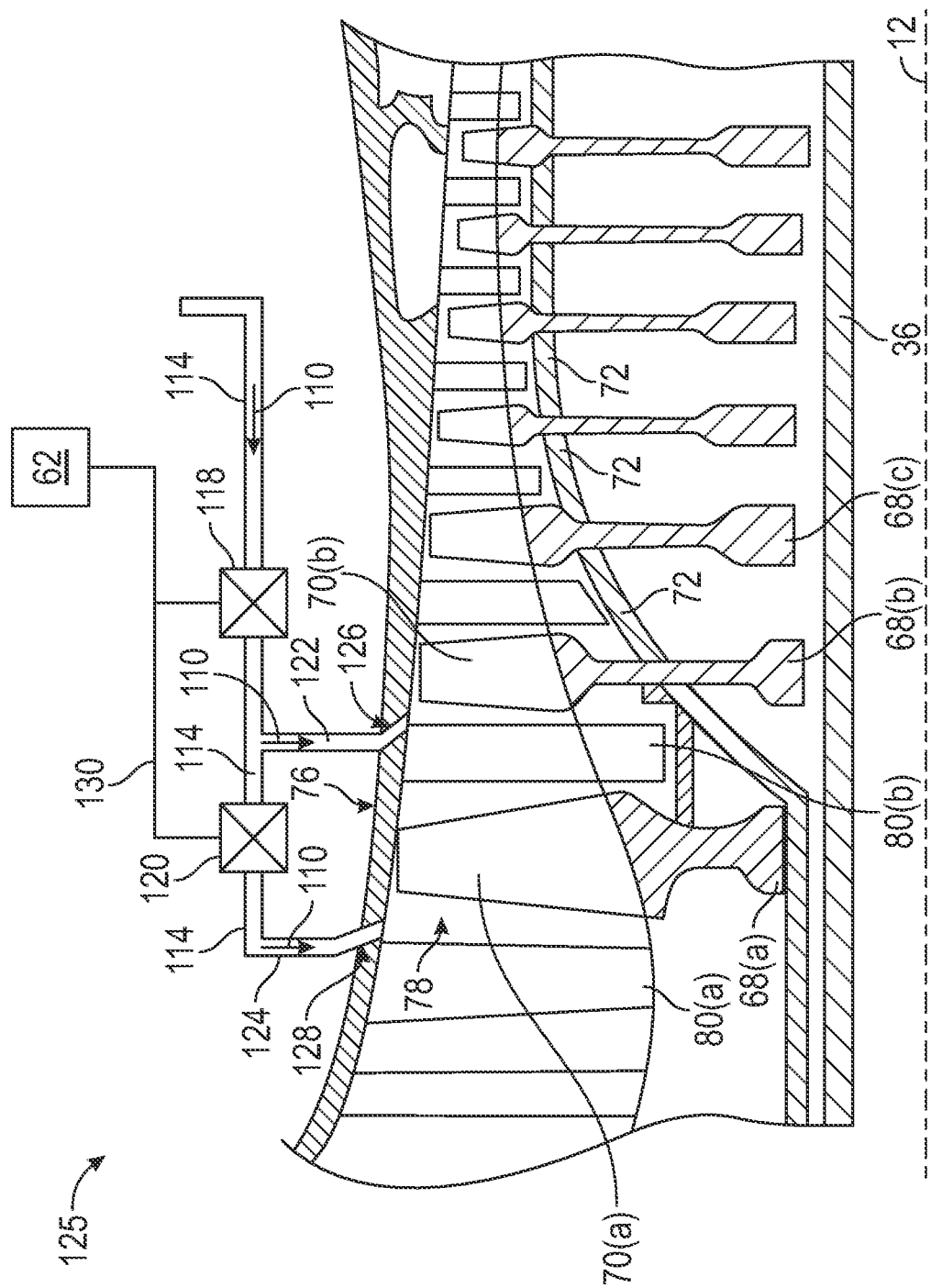
FIG. 4 is an enlarged view of a portion of the compressor section, taken at detail view 125 of FIG. 2, according to an aspect of the present disclosure.

FIG. 4 is an enlarged view of a portion of the compressor section 64, taken at detail view 125 of FIG. 2. As seen in FIG. 4, a manifold 122 branches off of the air-assist nozzle duct 114 downstream of the valve 118, and a manifold 124 branches off of the air-assist nozzle duct 114 downstream of the valve 120. Referring back to FIG. 3, the manifold 124 is seen to extend circumferentially about the stator shroud casing 76 and connects with a plurality of pressurized airflow nozzles 128 that may be arranged in a first array 129 circumferentially spaced about the stator shroud casing 76. In FIG. 3, the first array 129 is shown to include six pressurized airflow nozzles 128, but any number of pressurized airflow nozzles 128 may be included. Similarly, the manifold 122 is seen to extend circumferentially about the stator shroud casing 76 and connects with a plurality of pressurized airflow nozzles 126 that may be arranged in a second array 131 circumferentially spaced about the stator shroud casing 76. The plurality of pressurized airflow nozzles 126 may be circumferentially staggered with respect to the plurality of pressurized airflow nozzles 128, as shown for reference purposes as pressurized airflow nozzles 126(a). As shown in FIG. 4, the valve 118 and the valve 120 may be connected with the controller 62 via a communication signal line 130. In operation of air-assisted bowed-rotor mitigation system 84, the controller 62 may monitor any one of a number of conditions of the compressor section 64, such as a temperature, a rotation speed of the compressor rotor shaft assembly 66, a vibration level within the compressor, etc. The controller 62 may actuate the valve 118 from a closed state to an open state so as to permit the flow of pressurized air 110 from the pressurized air source 94 (FIG. 2) to flow downstream of the valve 118 to the manifold 122, and may optionally also actuate the valve 120 from a closed state to an open state to permit the flow of pressurized air 110 to flow to the manifold 124. The manifold 122 is connected to the plurality of pressurized airflow nozzles 126 and the manifold 124 is connected to the plurality of pressurized airflow nozzles 128. As shown in FIG. 4, the pressurized airflow nozzles 126 and the pressurized airflow nozzles 128 may extend through the stator shroud casing 76 to provide the flow of pressurized air 110 into the compressor flow passage 78 to cause the compressor rotor shaft assembly 66 to rotate for mitigating a bowed-rotor condition of the compressor rotors 68 during a shutdown phase of the engine 10.

Figure 5:
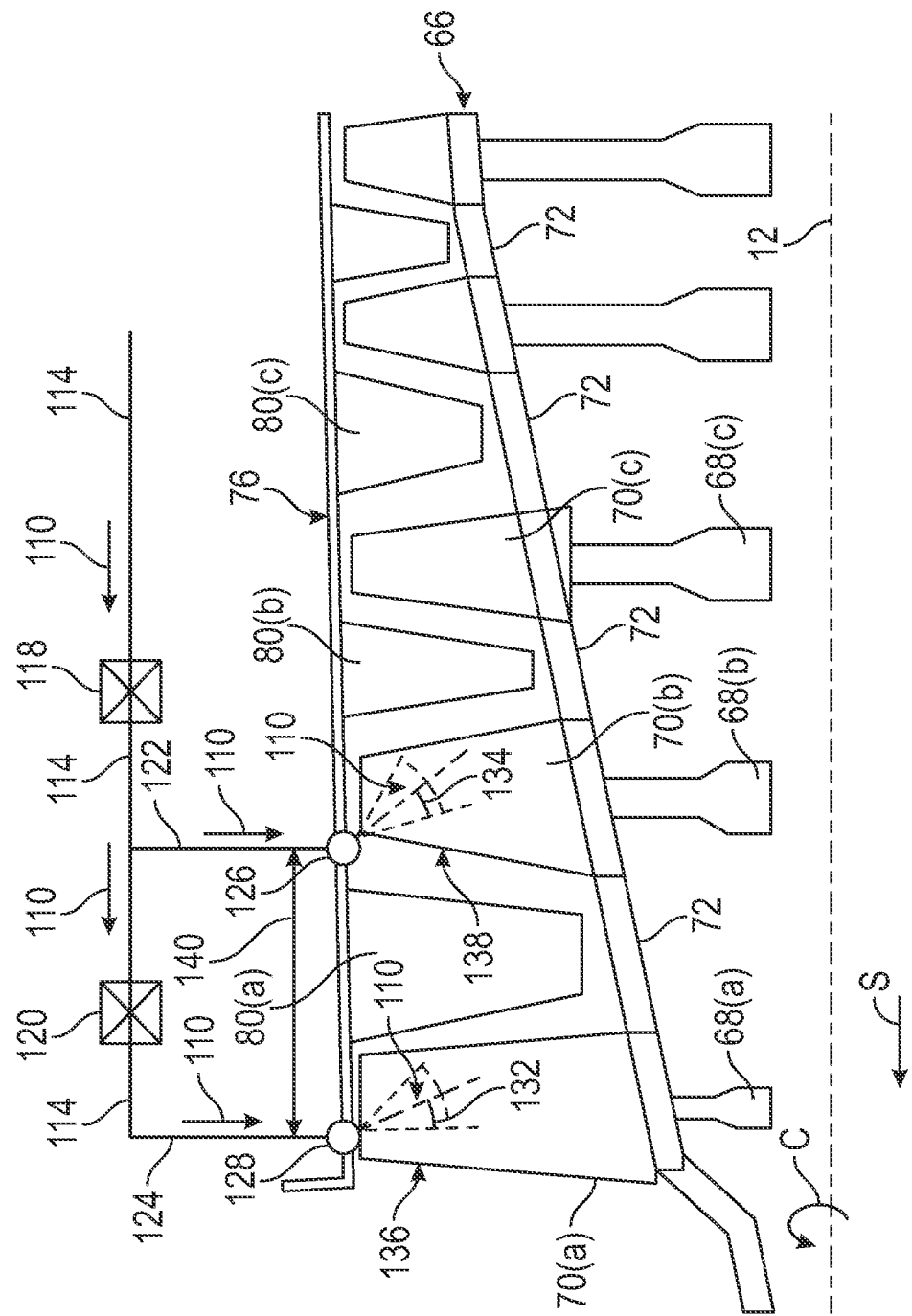
FIG. 5 is a schematic side view diagram depicting an example of a pressurized airflow from the pressurized airflow nozzles, according to an aspect of the present disclosure.

FIG. 5 is a schematic side view diagram depicting an example of a pressurized airflow from the pressurized airflow nozzles, according to an aspect of the present disclosure. As shown in FIG. 5, the plurality of compressor rotors 68 may include, for reference purposes, a first compressor rotor 68(a) having a plurality of compressor rotor vanes 70(a) circumferentially spaced about the first compressor rotor 68(a), similar to that shown in FIG. 3 for the compressor rotor 68 and compressor rotor vanes 70, a second compressor rotor 68(b) having a plurality of compressor rotor vanes 70(b) that are circumferentially spaced about the second compressor rotor 68(b), similar to that as shown in FIG. 3 for the compressor rotor 68 and compressor rotor vanes 70, and a third compressor rotor 68(c) having a plurality of compressor rotor vanes 70(c) that are circumferentially spaced about the third compressor rotor 68(c), similar to that as shown in FIG. 3 for the compressor rotor 68 and compressor rotor vanes 70. The plurality of pressurized airflow nozzles 128, which as stated above with regard to FIG. 3, may be arranged in an array circumferentially spaced about the stator shroud casing 76, are shown to be arranged at a forward edge 136 of the compressor rotor vanes 70(a) for the first compressor rotor 68(a). In the same manner, the pressurized airflow nozzles 126 which, as described above may be arranged in an array circumferentially about the stator shroud casing 76, are shown to be arranged at a forward edge 138 of the compressor rotor vanes 70(b) for the second compressor rotor 68(b). Alternatively, the pressurized airflow nozzles 126 may be arranged through the shroud casing 76 a longitudinal distance 140 from the pressurized airflow nozzles 128.

Each of the pressurized airflow nozzles 128 is arranged to direct the flow of pressurized air 110 therefrom onto the plurality of compressor rotor vanes 70(a) at an angle 132 with respect to the radial direction (R). In the same manner, each of the pressurized airflow nozzles 126 is arranged to direct the flow of pressurized air 110 onto the plurality of compressor rotor vanes 70(b) at an angle 134 with respect to the radial direction (R). Additionally, referring back to FIG. 3, the plurality of pressurized airflow nozzles 128 may be arranged to direct the flow of pressurized air 110 at an angle 142 with respect to the circumferential direction (C) and the radial direction (R). Thus, in the present aspect, the pressurized air 110 being directed onto the plurality of compressor rotor vanes 70(a) and optionally, onto the compressor rotor vanes 70(b), causes the compressor rotor shaft assembly 66 to rotate, thereby providing a more uniform cooling of the compressor rotor vanes 70(a), 70(b) during the engine shutdown phase in order to mitigate a bowed-rotor condition.

Figure 6:
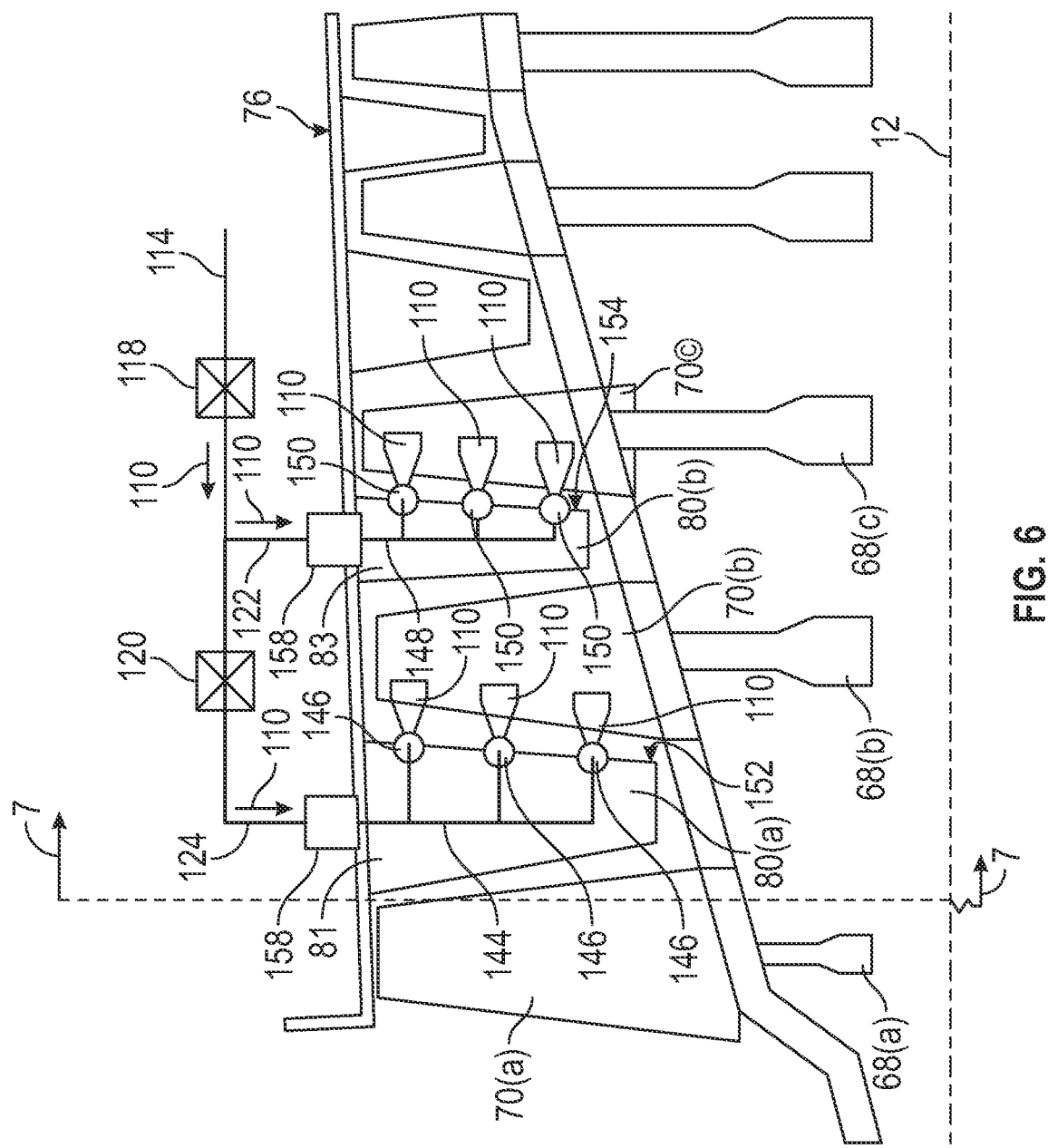
FIG. 6 is a schematic side view diagram depicting an example of a pressurized airflow from the pressurized airflow nozzles, according to another aspect of the present disclosure.
Figure 8:
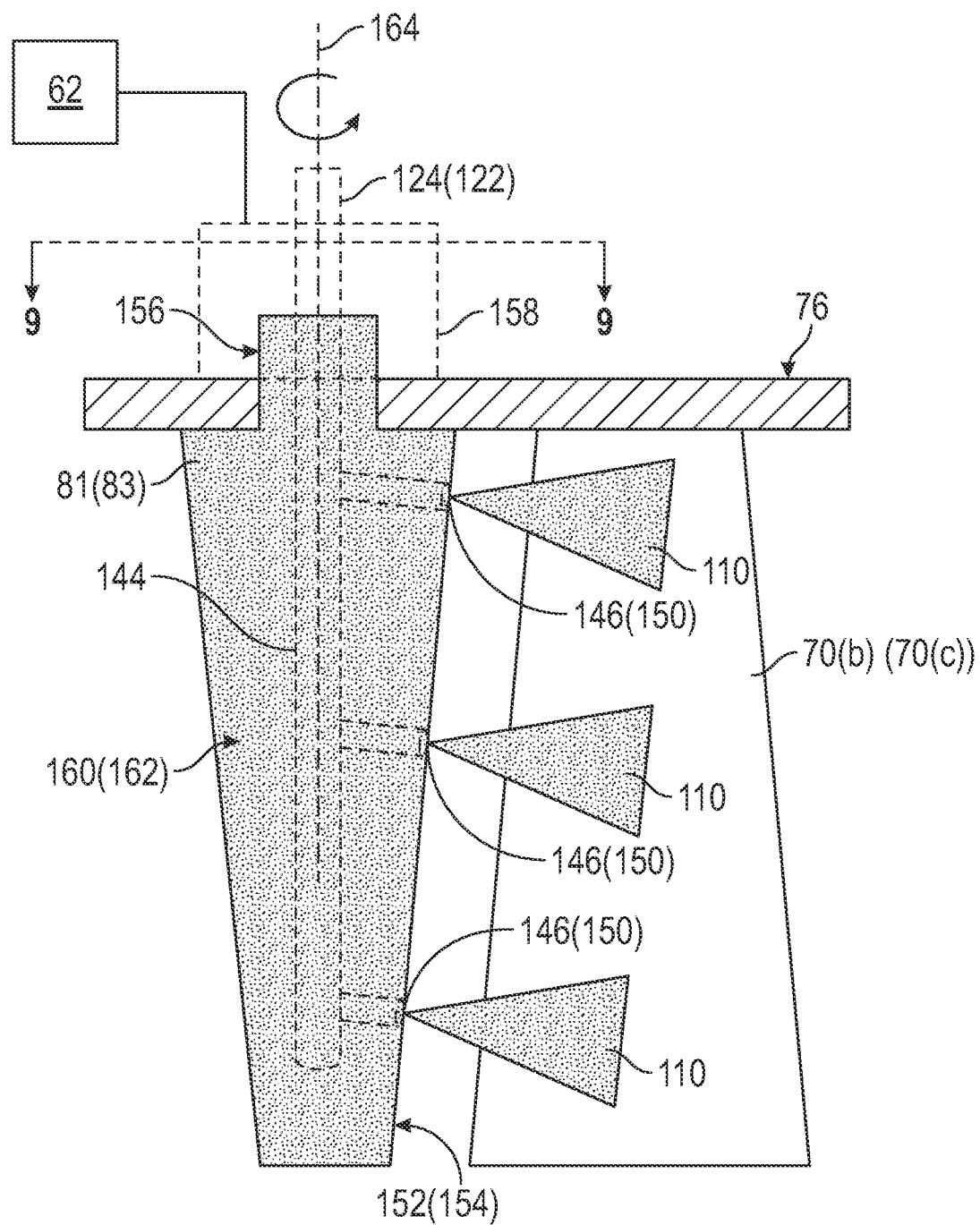
FIG. 8 is a schematic diagram depicting an example of a stator vane that includes a stator vane airflow passage, according to an aspect of the present disclosure.

FIG. 6 is a schematic side view diagram depicting an example of a pressurized airflow from the pressurized airflow nozzles, according to another aspect of the present disclosure. In the previous aspect, the plurality of pressurized airflow nozzles 128 and the plurality of pressurized airflow nozzles 126 are provided through the stator shroud casing 76 to provide the pressurized air 110 against the compressor rotor vanes 70 (see FIG. 5). In the present aspect, however, the pressurized air 110 is instead provided through pressurized stator vanes 81 that include a stator vane airflow passage 144 and a plurality of pressurized airflow nozzles 146. FIG. 8 depicts an example of a pressurized stator vane 81 that includes the stator vane airflow passage 144 therewithin, and includes a plurality of pressurized airflow nozzles 146 that are in fluid communication with the stator vane airflow passage 144. The plurality of pressurized airflow nozzles 146 may be arranged through a trailing edge 152 of the pressurized stator vane 81, and the plurality of pressurized airflow nozzles 150 may be arranged through a trailing edge 154 of the pressurized stator vane 83. When the valve 118 and the valve 120 are actuated by the controller 62 to the open state, and the pressurized air 110 is provided to the manifold 124, the pressurized air 110 flows into the stator vane airflow passage 144 and is then directed through the plurality of pressurized airflow nozzles 146 onto the plurality of compressor rotor vanes 70(b) of the second compressor rotor 68(b), as shown in FIG. 6, so as to cause the compressor rotor shaft assembly 66 to rotate.

Figure 7:
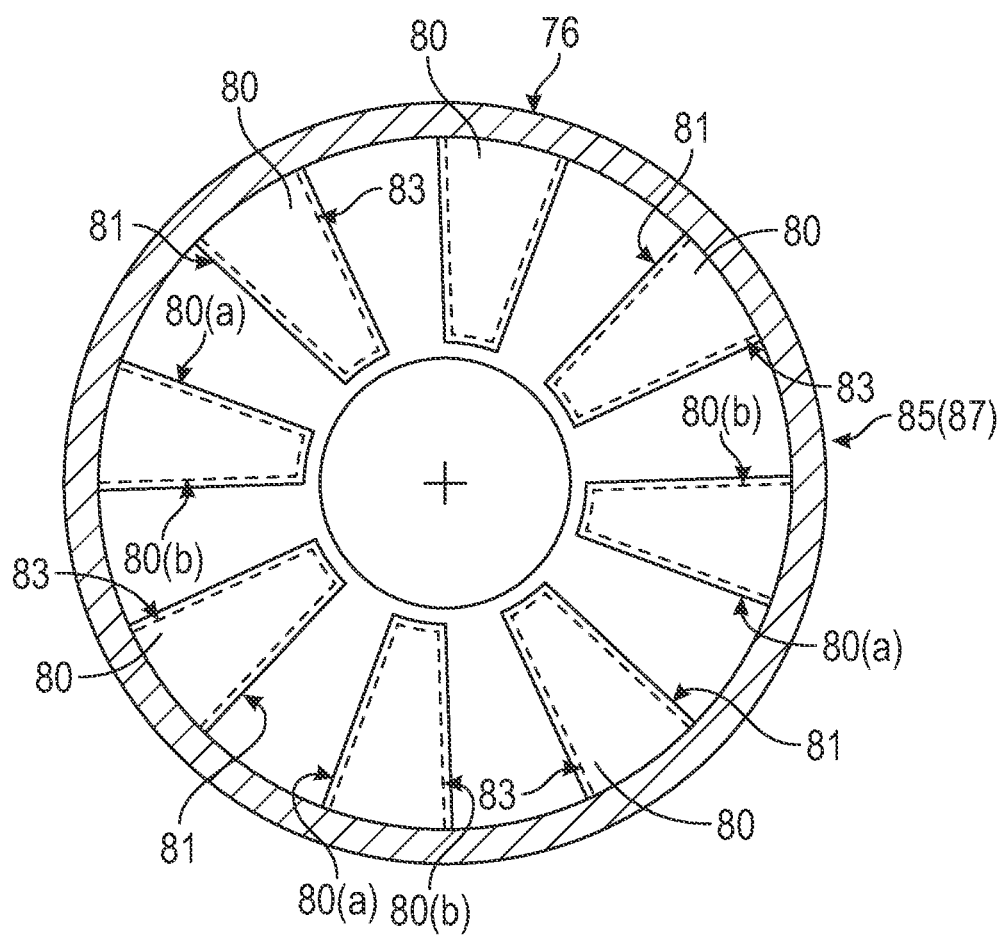
FIG. 7 is a partial cross-sectional aft-looking view taken at plane 7-7 of FIG. 6, according to an aspect of the present disclosure.

In the above description with regard to FIG. 2, the plurality of stator vanes 80 extend radially inward from the stator shroud casing 76, and are fixed to the stator shroud casing 76. Referring briefly to FIG. 7, which is a view taken at plane 7-7 of FIG. 6, the plurality of stator vanes 80 also extend circumferentially about the stator shroud casing 76. The stator vanes arranged circumferentially in a same circumferential row may also be considered to be a circumferential array of stator vanes. The stator vane 80(a) shown in FIGS. 5 and 6 may be included among a plurality of the stator vanes 80(a) that are arranged as a first circumferential array 85 about the stator shroud casing 76, similar to the stator vanes 80 shown in FIG. 7. Similarly, the stator vane 80(b) shown in FIGS. 5 and 6 may be included among a plurality of the stator vanes 80(b) that are arranged as a second circumferential array 87 of stator vanes about the stator shroud casing 76, similar to the stator vanes 80 of FIG. 7. The first circumferential array of stator vanes 80(a) and the second circumferential array 87 of stator vanes 80(b) are spaced apart in the longitudinal direction (L) so as to accommodate the second compressor rotor 68(b) having the compressor rotor vanes 70(b) therebetween. In the first circumferential array 85 of stator vanes 80(a), a plurality of the pressurized stator vanes 81 may be included within the array in place of the stator vanes 80(a). For example, as shown in FIG. 7, some of the stator vanes may be included in the first circumferential array 85, with pressurized stator vanes 81 also being included among the stator vanes 80(a). While FIG. 7 depicts eight total stator vanes arranged about the stator shroud casing 76, and four pressurized stator vanes 81 are depicted among the eight total stator vanes, it is common that the number of stator vanes in any one circumferential array may include as many as one-hundred stator vanes about the stator shroud casing 76. In this case, the number of pressurized stator vanes 81 that may be included within the circumferential array is merely dependent upon the total amount of pressurized air 110 to be ejected by the pressurized stator vanes 81 in order to provide sufficient rotation of the compressor rotor shaft assembly 66.

In the aspect of FIG. 6, in comparison with the aspect of FIG. 5, the stator vanes may include a plurality of pressurized stator vanes 83 instead. The pressurized stator vanes 83 are similar to the pressurized stator vanes 81, and include a stator vane airflow passage 148 therewithin, and a plurality of pressurized airflow nozzles 150 that eject the pressurized air 110 onto the compressor rotor vanes 70(c) of the third compressor rotor 68(c). The pressurized stator vanes 83 may be arranged within the second circumferential array 87 in the same manner that the pressurized stator vanes 81 are arranged within the first circumferential array 85. When the valve 118 is actuated to an open state by the controller 62 and the pressurized air 110 is provided to the manifold 122, the pressurized air 110 flows into the stator vane airflow passage 148 and is then directed through the plurality of pressurized airflow nozzles 150 onto the plurality of compressor rotor vanes 70(c) of the third compressor rotor 68(c), as shown in FIG. 6, so as to cause the compressor rotor shaft assembly 66 to rotate.

Figure 9:
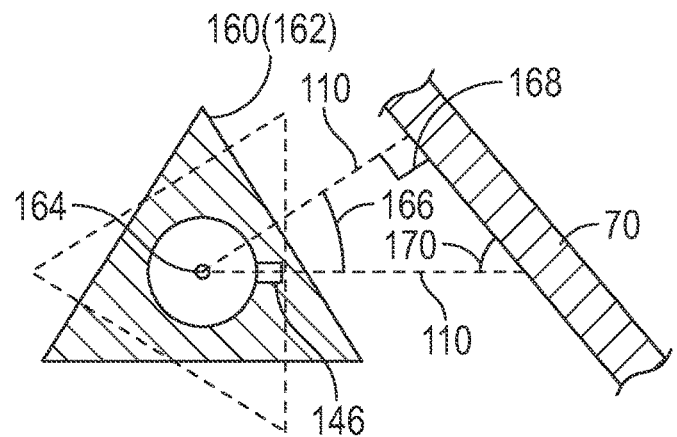
FIG. 9 is a schematic diagram of a variable stator vane and a compressor rotor vane, taken at plane 9-9 of FIG. 8, with a stator shroud casing removed, according to an aspect of the present disclosure.

As a further aspect of the pressurized stator vanes 81 and the pressurized stator vanes 83 shown in FIG. 8, the pressurized stator vanes 81 and/or the pressurized stator vanes 83, which are fixed to the stator shroud casing 76, may each be a variable stator vane instead that can be rotated to change an angle of the stator vane so as to change an angle of the flow of pressurized air 110 onto the plurality of compressor rotor vanes 70. For example, as shown in FIG. 8, a variable stator vane 160, and/or a variable stator vane 162, includes a stator vane shaft 156 that extends through the stator shroud casing 76 and engages with a stator vane actuator 158. The stator vane airflow passage 144 (146) extends through the stator vane shaft 156 and engages with the manifold 124 (122). The stator vane actuator 158 may be controlled by the controller 62 so as to rotate the variable stator vane 160 (162) about a central axis 164 of the stator vane shaft 156. For example, as shown in FIG. 9, which is a schematic diagram of the variable stator vane and a compressor rotor vane taken at plane 9-9 of FIG. 8 with the stator shroud casing 76 removed, the stator vane actuator 158 may rotate the variable stator vane 160 (162) an angle 166, clockwise, from a first position (shown with solid lines) to a second position (shown with dashed lines). Thus, as one example, a first impingement angle 168 of the flow of pressurized air 110 against the compressor rotor vane 70 may be changed from a first impingement angle 168 (shown as a right angle for the first position) to a second impingement angle 170 (shown as an acute angle (less than ninety degrees)). By varying the impingement angle of the pressurized air 110 against the plurality of compressor rotor vanes 70 utilizing the variable stator vanes 160 (162), the speed of rotation of the compressor rotor shaft assembly 66 can be controlled.

In the foregoing aspects, the pressurized air 110 is provided into the compressor flow passage 78 to cause the compressor rotor shaft assembly 66 to rotate by either providing the pressurized air 110 through a plurality of pressurized airflow nozzles 128 (126) extending through the stator shroud casing 76, or by providing the pressurized air 110 through the pressurized stator vanes 80(*a*), 80(*b*), 81, or 83. In another aspect according to the present disclosure, the pressurized air 110 is provided to the compressor flow passage 78 from nozzles in the compressor rotor shaft assembly 66 so as to cause the compressor rotor shaft assembly 66 to rotate. Referring back to FIG. 2, for the present aspect, the compressor rotor shaft assembly 66 includes a cavity 174 therewithin. A valve 176 is provided in the compressor bleed air system 86 near the compressor bleed port 88, and a duct 172 connects the valve 176 to the cavity 174 within the compressor rotor shaft assembly 66. With the present aspect, the air-assist nozzle duct 114, the valve 118, the valve 120, the plurality of pressurized airflow nozzles 128, and the plurality of pressurized airflow nozzles 126 may not be included as part of the air-assisted bowed-rotor mitigation system 84. During a shutdown phase, the compressor bleed port 88 may be closed and the bleed valve 92 may also be closed. When the air-assisted bowed-rotor mitigation system 84 is activated by the controller 62, the pressurized air source 94 is actuated to begin providing the flow of pressurized air 110, and the valve 108, the valve 112, and the valve 176 may be opened by the controller 62. The flow of pressurized air 110 flows through the pressurized air duct 104, through the compressor bleed air duct 90 as a reverse flow as compared to the flow of bleed air 91, through the opened valve 176, through the duct 172, and into the cavity 174 within the compressor rotor shaft assembly 66. As a result, the cavity 174 is pressurized by the pressurized air 110.

Figure 10:
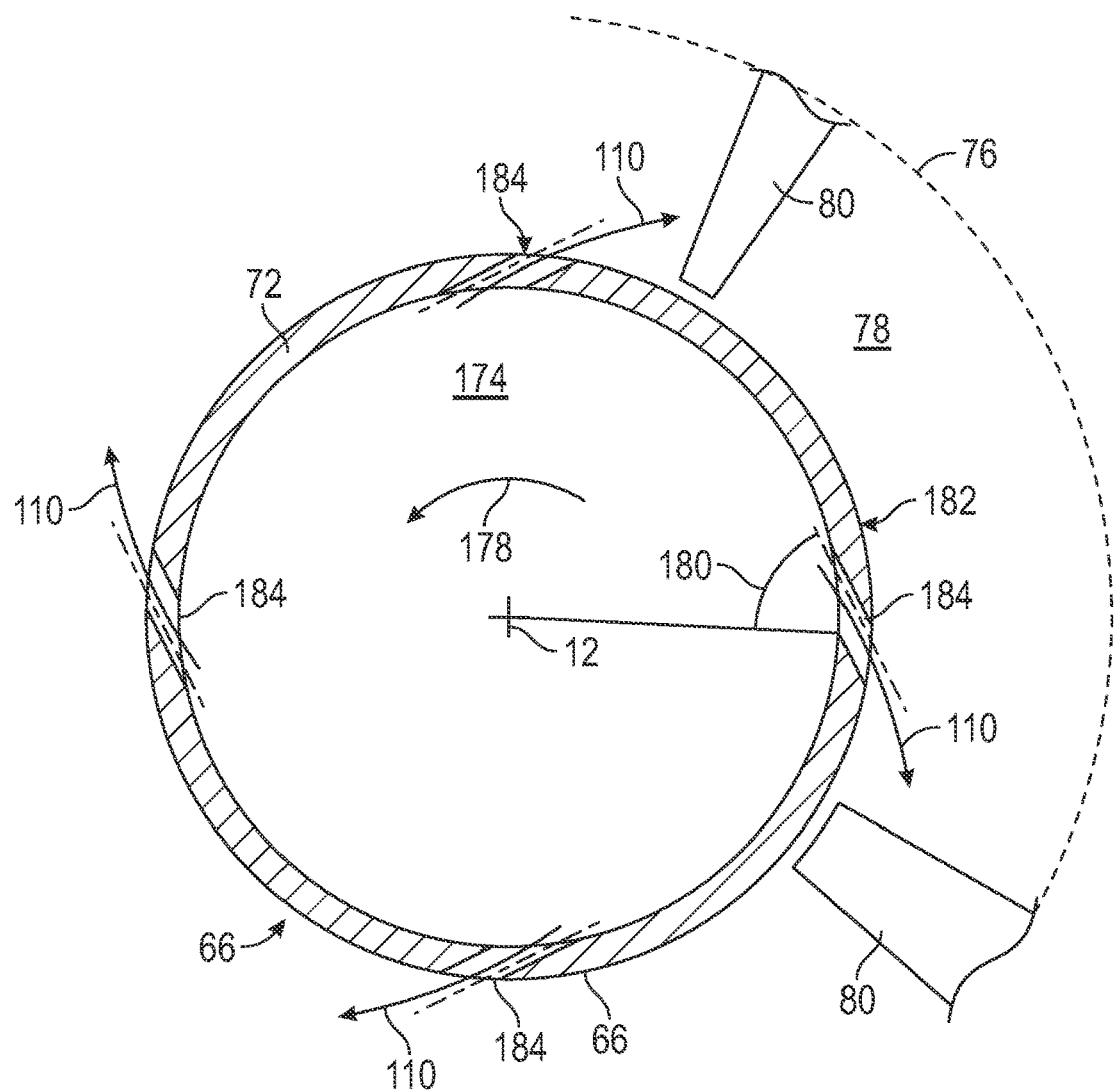
FIG. 10 is a schematic partial cross-sectional view of a rotor section of the compressor rotor shaft assembly, taken at plane 10-10 of FIG. 2, according to the present aspect of the disclosure.

FIG. 10 is a schematic partial cross-sectional view of a rotor shaft section 72 of the compressor rotor shaft assembly 66, taken at plane 10-10 of FIG. 2, according to the present aspect of the disclosure. As seen in FIG. 10, a rotor shaft section 72 of the compressor rotor shaft assembly 66 includes a plurality of rotor shaft pressurized airflow nozzles 184 that extend through the rotor shaft section 72. Each of the rotor shaft pressurized airflow nozzles 184 is arranged at a tangential angle 180 so that the flow of pressurized air 110 from the pressurized cavity 174 into the compressor flow passage 78 is generally in a tangential direction being generally tangential with respect to an outer surface 182 of the rotor shaft section 72. The pressurized air 110 through the plurality of rotor shaft pressurized airflow nozzles 184 generates a torque force so as to rotate the compressor rotor shaft assembly 66 in a rotation direction 178 that is opposite to the tangential flow of the pressurized air 110. Since the rotor shaft section 72 is generally provided in radial arrangement with an array of the plurality of stator vanes 80, the tangential flow of the pressurized air 110 from the rotor shaft pressurized airflow nozzles 184 may impinge against the stator vanes 80 so as to provide additional force in generating the torque for causing the compressor rotor shaft assembly 66 to rotate.

In the foregoing description, the pressurized air source 94 was described as constituting an air pump incorporated within the air-assisted bowed-rotor mitigation system 84 within the core engine 16. However, the present disclosure is not limited to the air pump within the core engine 16, and, instead, the pressurized air source may be external to the engine 10. For example, the air-assisted bowed-rotor mitigation system 84 may omit the air pump (pressurized air source 94) within the core engine 16 and, instead, a ground power unit or other pressurized air source (not shown) external to the engine 10, or external to an aircraft on which the engine 10 is implemented, may be connected with the inlet 102 so as to provide a flow of the pressurized air 110 through the air intake duct 101. The remaining portions, other than the pressurized air source 94 (air pump), of the air-assisted bowed-rotor mitigation system 84 may be implemented in the same manner as described above so as to cause the compressor rotor shaft assembly 66 to rotate utilizing the pressurized air 110 in order to mitigate a bowed-rotor condition during a shutdown phase of the engine 10.

Figure 11:
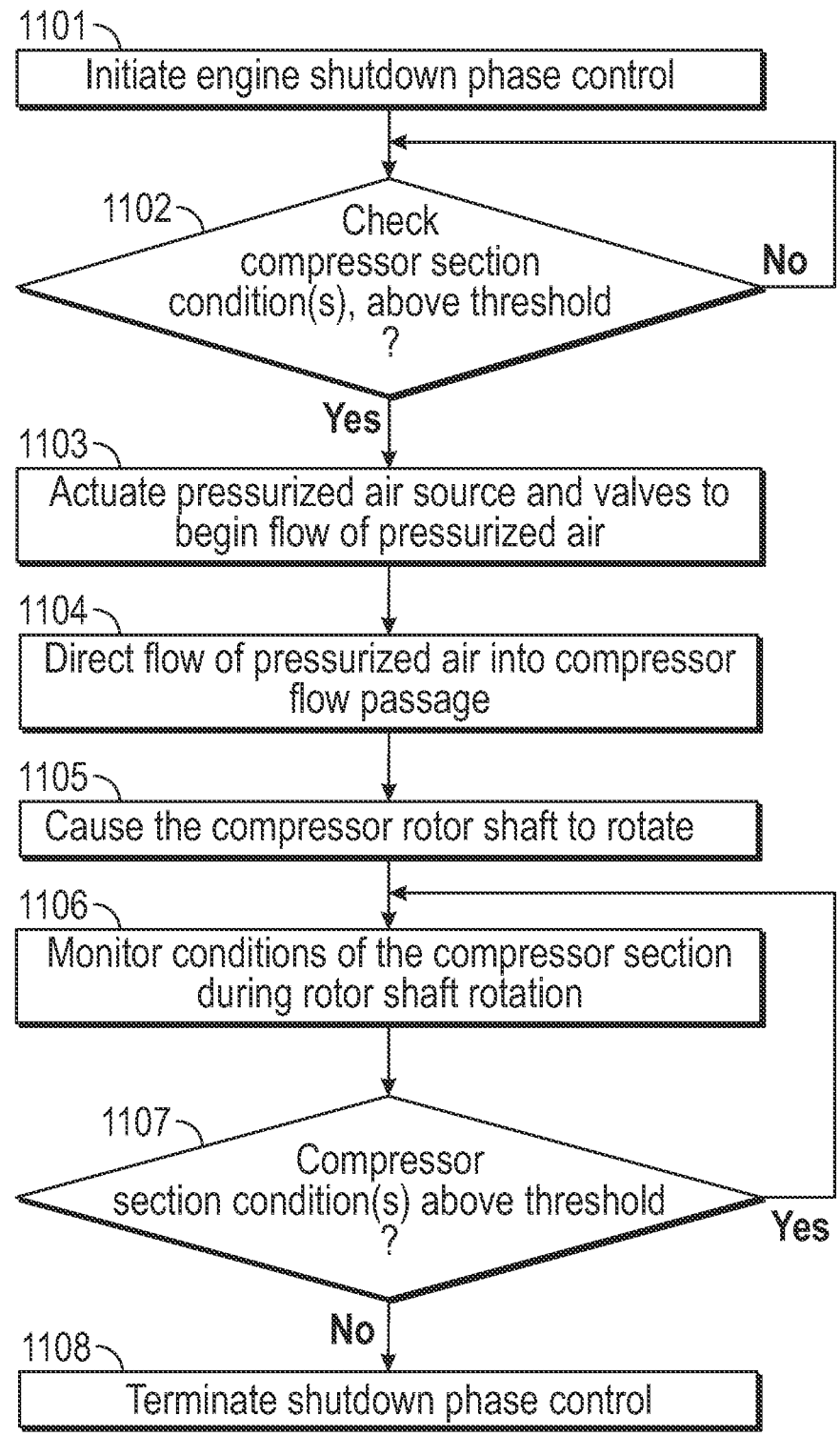
FIG. 11 is a flowchart of process steps of a method of operating a gas turbine engine, according to an aspect of the present disclosure.

FIG. 11 is a flowchart of process steps for a method of mitigating a bowed-rotor condition. The method may be practiced in the gas turbine engine 10 that includes the air-assisted bowed-rotor mitigation system 84 according to any of the foregoing aspects described above in FIGS. 1 through 10. The method may be controlled by the controller 62 as part of a shutdown phase of operation for the gas turbine engine 10. In step 1101, the controller 62 initiates the engine shutdown phase control. An engine shutdown phase is generally performed at the end of a flight, after the aircraft has parked, and a fuel flow to a combustor of the engine is terminated so as to wind down the engine. Of course, a shutdown operation could be performed at any time after an engine has been operated (e.g., a ground test run, or taxi between ground locations), and not just at the end of a flight. Similarly, for a land-based engine application or a marine-based engine application, a shutdown phase may be initiated any time after the engine has been operable. In the method of the present disclosure, when the shutdown phase is initiated, in step 1102, the controller checks (monitors) at least one condition of the compressor section 64 of the gas turbine engine 10. The at least one condition may be, for example, a temperature of the compressor section 64. Alternatively, the controller 62 may merely check to confirm that the fuel flow has been terminated and/or that the combustor has been shut down, and then automatically initiate the shutdown phase control. In step 1103, the controller 62, based on a result of the checked at least one condition, actuates the pressurized air source 94, and actuates any one or more of the valve 108, the valve 112, the valve 118, the valve 120 and/or the valve 176 to be in a closed state or in an open state, so as to begin providing the flow of pressurized air 110 to flow from the pressurized air source 94 to the plurality of pressurized airflow nozzles 128, 126, 146, 150, 184. In step 1104, the plurality of pressurized airflow nozzles 128, 126, 146, 150, 184 direct the flow of pressurized air 110 into the compressor flow passage 78, and, in step 1105, the directing of the flow of pressurized air 110 into the compressor flow passage 78 causes the compressor rotor shaft assembly 66 to rotate. In step 1106, while the compressor rotor shaft assembly 66 is rotating, the controller 62 monitors the at least one condition of the compressor section 64. For example, the controller 62 may monitor the temperature of the compressor section 64. In step 1107, the controller determines whether or not a threshold value of the at least one condition has been met in the monitoring. If the controller determines that the monitored condition is above the threshold value (YES in step 1107), the shutdown phase control continues so as to continue causing the compressor rotor shaft assembly 66 to rotate, and the controller 62 continues monitoring the at least one condition. Once the monitored condition has been determined to be below the threshold value (NO in step 1107), then, in step 1108, the controller 62 terminates the shutdown phase control.

With the foregoing aspects, the present disclosure provides an air-assisted bowed-rotor mitigation system and a related method so as to provide a flow of pressurized air into the compressor section during an engine shutdown phase so as to cause the compressor rotor shaft assembly to rotate. By providing the continued rotation of the compressor rotor shaft assembly after engine shutdown, a bowed-rotor condition can be mitigated since one side (top side) of the compressor rotor shaft is not subjected to the heat stratification in the engine core. The pressurized air flow itself may also provide for additional cooling of the compressor rotor vanes, thereby further mitigating the bowed-rotor condition.

While the foregoing description relates generally to a gas turbine engine, the gas turbine engine may be implemented in various environments. For example, the engine may be implemented in an aircraft, but may also be implemented in non-aircraft applications, such as power generating stations, marine applications, or oil and gas production applications. Thus, the present disclosure is not limited to use in aircraft.

Further aspects of the present disclosure are provided by the subject matter of the following clauses.

A gas turbine engine comprising a compressor section including (a) a compressor rotor shaft assembly including a plurality of compressor rotors longitudinally spaced apart from each other via respective ones of a plurality of shaft sections of a rotor shaft, each compressor rotor of the plurality of compressor rotors having a plurality of rotor vanes extending radially outward therefrom and being circumferentially spaced about the compressor rotor, and (b) a stator shroud assembly including a stator shroud casing surrounding the compressor rotor shaft assembly, a compressor flow passage being defined between the compressor rotor shaft assembly and the stator shroud casing, a pressurized air source that generates a flow of pressurized air to be provided to the compressor section, and a plurality of pressurized airflow nozzles connected with the pressurized air source and that provide the flow of pressurized air into the compressor flow passage to cause the compressor rotor shaft assembly to rotate.

The gas turbine engine according to the preceding clause, wherein the gas turbine engine is mounted in an aircraft, and the pressurized air source is any one of an auxiliary power unit mounted in the aircraft, an air pump mounted in the aircraft, and an air source external to and connected to the aircraft during a shutdown phase of the gas turbine engine.

The gas turbine engine according to any preceding clause, wherein the compressor rotor shaft assembly defines a pressurized cavity therewithin that is in fluid communication with the pressurized air source, and the plurality of pressurized airflow nozzles being arranged through at least one rotor shaft section of the compressor rotor shaft assembly, the plurality of pressurized airflow nozzles being circumferentially spaced apart and arranged to provide a tangential flow of air therefrom, with respect to a circumferential direction about the compressor rotor shaft assembly, into the compressor flow passage so as to cause the compressor rotor shaft assembly to rotate.

The gas turbine engine according to any preceding clause, wherein the stator shroud assembly includes a plurality of pressurized stator vanes that each include (i) a stator vane airflow passage therewithin that is in fluid communication with the pressurized air source, and (ii) at least one pressurized airflow nozzle, from among the plurality of pressurized airflow nozzles, arranged to direct the flow of pressurized air onto the plurality of rotor vanes of at least one of the plurality of compressor rotors so as to cause the compressor rotor shaft assembly to rotate.

The gas turbine engine according to any preceding clause, wherein each pressurized stator vane among the plurality of pressurized stator vanes is a variable stator vane, and a controller controls a variable angle of each variable stator vane to control an impingement angle of the pressurized air vane from the at least one pressurized airflow nozzle against the plurality of rotor vanes for a respective compressor rotor.

The gas turbine engine according to any preceding clause, further comprising (i) a core engine outer casing arranged radially outward of the stator shroud casing, the pressurized air source being arranged between the stator shroud casing and the core engine outer casing, (ii) an air intake duct connected to an inlet through the core engine casing and connected to the pressurized air source, and (iii) a pressurized air duct connecting the pressurized air source to the plurality of pressurized airflow nozzles.

The gas turbine engine according to any preceding clause, further comprising at least one valve provided in the pressurized air duct to control a flow of pressurized air, generated by the pressurized air source, to the plurality of pressurized airflow nozzles.

The gas turbine engine according to any preceding clause, wherein the pressurized air source is an air pump, and a controller controls the air pump and the at least one valve during an engine shutdown phase so as to generate a flow of pressurized air that is provided to the plurality of pressurized airflow nozzles to cause the compressor rotor shaft assembly to rotate.

The gas turbine engine according to any preceding clause, wherein the controller monitors at least one operating condition of the compressor section during the engine shutdown phase to control the air pump and the at least one valve, the at least one operating condition of the compressor section comprising any of a compressor section temperature, a rotation speed of the compressor rotor shaft assembly, and a vibration level.

The gas turbine engine according to any preceding clause, wherein the plurality of pressurized airflow nozzles are arranged at the stator shroud casing and direct the flow of pressurized air through the stator shroud casing onto the plurality of rotor vanes of at least one compressor rotor among the plurality of compressor rotors so as to cause the compressor rotor shaft assembly to rotate.

The gas turbine engine according to any preceding clause, wherein the plurality of pressurized airflow nozzles are arranged in an array circumferentially about the stator shroud casing.

The gas turbine engine according to any preceding clause, including a first array of the plurality of pressurized airflow nozzles and a second array of the pressurized airflow nozzles, the first array and the second array being spaced apart from one another in a longitudinal direction, and the plurality pressurized airflow nozzles of the first array being circumferentially staggered with respect to the plurality of pressurized airflow nozzles of the second array.

The gas turbine engine according to any preceding clause, wherein a plurality of arrays of the pressurized airflow nozzles are arranged about the stator shroud casing, each array of the plurality of arrays being spaced apart in a longitudinal direction and corresponding to a respective compressor rotor of the plurality of compressor rotors.

A method of operating a gas turbine engine that includes (a) a compressor section, including (i) a compressor rotor shaft assembly having a plurality of compressor rotors, each compressor rotor including a plurality of rotor vanes, and (ii)

a stator shroud assembly including a stator shroud surrounding the compressor rotor shaft assembly, a compressor flow passage being defined between the compressor rotor shaft assembly and the stator shroud, (b) a pressurized air source that generates a flow of pressurized air to be provided to the compressor section, (c) a plurality of pressurized airflow nozzles connected with the pressurized air source and are configured to provide a flow of pressurized air into the compressor flow passage, and (d) a controller, the method comprising initiating, by the controller, control of an engine shutdown phase, the control of the engine shutdown phase comprising (a) checking, by the controller during the engine shutdown phase, at least one condition of the compressor section of the gas turbine engine, (b) actuating, by the controller and based on a result of the checking the at least one condition, the pressurized air source to begin providing a flow of pressurized air to flow from the pressurized air source to the plurality of pressurized airflow nozzles, (c) directing, by the plurality of pressurized airflow nozzles, the flow of pressurized air into the compressor flow passage, (d) causing, by the directing of the flow of pressurized air into the compressor flow passage, the compressor rotor shaft assembly to rotate, (e) monitoring, by the controller, the at least one condition of the compressor section while the compressor rotor shaft assembly rotates, (f) determining, by the controller, whether or not a threshold value of the at least one condition has been met in the monitoring, and (g) terminating, by the controller, the control of the engine shutdown phase when the determining determines that the threshold value of the at least one condition has been met.

The method according to the preceding clause, wherein the at least one condition comprises at least one of a temperature at the compressor section and a rotation speed of the compressor rotor shaft assembly.

The method according to any preceding clause, wherein the plurality of pressurized airflow nozzles are arranged to provide the flow of pressurized air through the stator shroud and to direct the flow of pressurized air onto the plurality of rotor vanes of at least one of the plurality of compressor rotors so as to cause the compressor rotor shaft assembly to rotate.

The method according to any preceding clause, wherein the stator shroud assembly includes a plurality of pressurized stator vanes, each pressurized stator vane including a stator vane airflow passage therewithin and at least one pressurized airflow nozzle, among the plurality of pressurized airflow nozzles, in fluid communication with the stator vane airflow passage, and, in the directing, the pressurized airflow nozzles of the plurality of pressurized stator vanes direct the flow of pressurized air onto the plurality of rotor vanes of at least one of the plurality of compressor rotors so as to cause the compressor rotor shaft assembly to rotate.

The method according to any preceding clause, wherein the plurality of pressurized stator vanes are variable stator vanes capable of being angularly adjusted about a stator vane axis, and, in the directing, the controller controls an angle of the variable stator vanes to adjust an impingement angle of the flow of pressurized air against the plurality of rotor vanes.

The method according to any preceding clause, wherein the compressor rotor shaft assembly defines a pressurized cavity therewithin that is in fluid communication with the pressurized air source, and the plurality of pressurized airflow nozzles are arranged through at least one rotor shaft section of the compressor rotor shaft assembly, the plurality of pressurized airflow nozzles being circumferentially spaced apart and arranged to provide a tangential flow of air therefrom, with respect to a circumferential direction about the compressor rotor shaft assembly, and, in the directing, the plurality of pressurized airflow nozzles direct the flow of pressurized air therefrom in a tangential direction into the compressor flow passage so as to cause the compressor rotor shaft assembly to rotate.

The method according to any preceding clause, wherein the gas turbine engine further comprises a ducting system connecting the pressurized air source and the plurality of pressurized airflow nozzles, and at least one valve within the ducting system, the method further comprising the controller controlling the at least one valve based on the at least one condition, and the plurality of pressurized airflow nozzles includes a first array of pressurized airflow nozzles corresponding to a first compressor rotor among the plurality of compressor rotors, and a second array of pressurized airflow nozzles corresponding to a second compressor rotor, the at least one valve includes a first valve for controlling an airflow to the first array of pressurized airflow nozzles and a second valve for controlling an airflow to the second array of pressurized airflow nozzles, the method further comprising the controller controlling at least one of the first valve and the second valve to be in an open state or in a closed state, based on the at least one condition.

Although the foregoing description is directed to some exemplary embodiments of the present disclosure, it is noted that other variations and modifications will be apparent to those skilled in the art, and may be made without departing from the spirit or the scope of the disclosure. Moreover, features described in connection with one embodiment of the present disclosure may be used in conjunction with other embodiments, even if not explicitly stated above.

We claim:

1. A method of operating a gas turbine engine that includes (a) a compressor section, including (i) a compressor rotor shaft assembly including a plurality of compressor rotors longitudinally spaced apart from each other via respective ones of a plurality of shaft sections of a rotor shaft, each compressor rotor of the plurality of compressor rotors having a plurality of rotor vanes extending radially outward therefrom and being circumferentially spaced about the compressor rotor, and (ii) a stator shroud assembly including a stator shroud surrounding the compressor rotor shaft assembly, a compressor flow passage being defined between the compressor rotor shaft assembly and the stator shroud casing, (b) a pressurized air source that generates a flow of pressurized air to be provided to the compressor section, (c) a plurality of pressurized airflow nozzles connected with the pressurized air source and are configured to provide a flow of pressurized air into the compressor flow passage as a primary driver source to cause the compressor rotor shaft assembly to rotate during a shutdown phase of the gas turbine engine, (d) a controller, (e) a core engine outer casing arranged radially outward of the stator shroud casing, the pressurized air source being arranged between the stator shroud casing and the core engine outer casing, (f) an air intake duct connected to an inlet through the core engine outer casing and connected to the pressurized air source, and (g) a pressurized air duct connecting the pressurized air source to the plurality of pressurized airflow nozzles, the method comprising:

initiating, by the controller, control of the shutdown phase, the control of the shutdown phase comprising:
(a) checking, by the controller during the shutdown phase, at least one condition of the compressor section of the gas turbine engine;

(b) actuating, by the controller and based on a result of the checking the at least one condition, the pressurized air source to begin providing the flow of pressurized air to flow from the pressurized air source to the plurality of pressurized airflow nozzles;

(c) directing, by the plurality of pressurized airflow nozzles, the flow of pressurized air into the compressor flow passage;

(d) causing, by the directing of the flow of pressurized air into the compressor flow passage, the compressor rotor shaft assembly to rotate;

(e) monitoring, by the controller, the at least one condition of the compressor section while the compressor rotor shaft assembly rotates;

(f) determining, by the controller, whether a threshold value of the at least one condition has been met in the monitoring; and (g) terminating, by the controller, the control of the shutdown phase when the threshold value of the at least one condition has been met.

2. The method according to claim 1, wherein the at least one condition comprises at least one of a temperature at the compressor section and a rotation speed of the compressor rotor shaft assembly.

3. The method according to claim 1, wherein the plurality of pressurized airflow nozzles are arranged to provide the flow of pressurized air through the stator shroud casing and to direct the flow of pressurized air onto the plurality of rotor vanes of at least one of the plurality of compressor rotors so as to cause the compressor rotor shaft assembly to rotate.

4. The method according to claim 1, wherein the stator shroud assembly includes a plurality of pressurized stator vanes, each pressurized stator vane including a stator vane airflow passage therewithin and at least one pressurized airflow nozzle, among the plurality of pressurized airflow nozzles, in fluid communication with the stator vane airflow passage, and, in the directing, the pressurized airflow nozzles of the plurality of pressurized stator vanes direct the flow of pressurized air onto the plurality of rotor vanes of at least one of the plurality of compressor rotors so as to cause the compressor rotor shaft assembly to rotate.

5. The method according to claim 4, wherein the plurality of pressurized stator vanes are variable stator vanes capable of being angularly adjusted about a stator vane axis, and, in the directing, the controller controls an angle of the variable stator vanes to adjust an impingement angle of the flow of pressurized air against the plurality of rotor vanes.

6. The method according to claim 1, wherein the compressor rotor shaft assembly defines a pressurized cavity therewithin that is in fluid communication with the pressurized air source, and the plurality of pressurized airflow nozzles are arranged through at least one rotor shaft section of the compressor rotor shaft assembly, the plurality of pressurized airflow nozzles being circumferentially spaced apart and arranged to provide a tangential flow of air therefrom, with respect to a circumferential direction about the compressor rotor shaft assembly, and, in the directing, the plurality of pressurized airflow nozzles direct the flow of pressurized air therefrom in a tangential direction into the compressor flow passage so as to cause the compressor rotor shaft assembly to rotate.

7. The method according to claim 1, wherein the pressurized air duct includes at least one valve, the method further comprising the controller controlling the at least one valve based on the at least one condition, and the plurality of pressurized airflow nozzles includes a first array of pressurized airflow nozzles corresponding to a first compressor rotor among the plurality of compressor rotors, and a second array of pressurized airflow nozzles corresponding to a second compressor rotor, the at least one valve includes a first valve for controlling airflow to the first array of pressurized airflow nozzles and a second valve for controlling airflow to the second array of pressurized airflow nozzles, the method further comprising the controller controlling at least one of the first valve and the second valve to be in an open state or in a closed state, based on the at least one condition.

8. A gas turbine engine comprising:
a compressor section including (a) a compressor rotor shaft assembly including a plurality of compressor rotors longitudinally spaced apart from each other via respective ones of a plurality of shaft sections of a rotor shaft, each compressor rotor of the plurality of compressor rotors having a plurality of rotor vanes extending radially outward therefrom and being circumferentially spaced about the compressor rotor, and (b) a stator shroud assembly including a stator shroud casing surrounding the compressor rotor shaft assembly, a compressor flow passage being defined between the compressor rotor shaft assembly and the stator shroud casing;
a pressurized air source that generates a flow of pressurized air to be provided to the compressor section;
a plurality of pressurized airflow nozzles connected with the pressurized air source and that provide the flow of pressurized air into the compressor flow passage as a primary driver source to cause the compressor rotor shaft assembly to rotate during a shutdown phase of the gas turbine engine;
a core engine outer casing arranged radially outward of the stator shroud casing, the pressurized air source being arranged between the stator shroud casing and the core engine outer casing;
an air intake duct connected to an inlet through the core engine outer casing and connected to the pressurized air source; and
a pressurized air duct connecting the pressurized air source to the plurality of pressurized airflow nozzles.

9. The gas turbine engine according to claim 6, wherein the stator shroud assembly includes a plurality of pressurized stator vanes that each include (i) a stator vane airflow passage therewithin that is in fluid communication with the pressurized air source, and (ii) at least one pressurized airflow nozzle, from among the plurality of pressurized airflow nozzles, arranged to direct the flow of pressurized air onto the plurality of rotor vanes of at least one of the plurality of compressor rotors so as to cause the compressor rotor shaft assembly to rotate.

10. The gas turbine engine according to claim 9, wherein each pressurized stator vane among the plurality of pressurized stator vanes is a variable stator vane, and a controller controls a variable angle of each variable stator vane to control an impingement angle of the flow of pressurized air from the at least one pressurized airflow nozzle against the plurality of rotor vanes for a respective compressor rotor.

11. The gas turbine engine according to claim 8, further comprising at least one valve provided in the pressurized air duct to control a flow of pressurized air, generated by the pressurized air source, to the plurality of pressurized airflow nozzles.

12. The gas turbine engine according to claim 11, wherein the pressurized air source is an air pump, and a controller controls the air pump and the at least one valve during the shutdown phase so as to generate a flow of pressurized air that is provided to the plurality of pressurized airflow nozzles to cause the compressor rotor shaft assembly to rotate.

13. The gas turbine engine according to claim 12, wherein the controller monitors at least one operating condition of the compressor section during the shutdown phase to control the air pump and the at least one valve, the at least one operating condition of the compressor section comprising any of a compressor section temperature, a rotation speed of the compressor rotor shaft assembly, and a vibration level.

14. The gas turbine engine according to claim 8, wherein the plurality of pressurized airflow nozzles are arranged at the stator shroud casing and direct the flow of pressurized air through the stator shroud casing onto the plurality of rotor vanes of at least one compressor rotor among the plurality of compressor rotors so as to cause the compressor rotor shaft assembly to rotate.

15. The gas turbine engine according to claim 14, wherein the plurality of pressurized airflow nozzles are arranged in an array circumferentially about the stator shroud casing.

16. The gas turbine engine according to claim 15, including a first array of the plurality of pressurized airflow nozzles and a second array of the plurality of pressurized airflow nozzles, the first array and the second array being spaced apart from one another in a longitudinal direction, and the plurality pressurized airflow nozzles of the first array being circumferentially staggered with respect to the plurality of pressurized airflow nozzles of the second array.

17. The gas turbine engine according to claim 15, wherein a plurality of arrays of the pressurized airflow nozzles are arranged about the stator shroud casing, each array of the plurality of arrays being spaced apart in a longitudinal direction and corresponding to a respective compressor rotor of the plurality of compressor rotors.

18. A gas turbine engine comprising:
a compressor section including (a) a compressor rotor shaft assembly including a plurality of compressor rotors longitudinally spaced apart from each other via respective ones of a plurality of shaft sections of a rotor shaft, each compressor rotor of the plurality of compressor rotors having a plurality of rotor vanes extending radially outward therefrom and being circumferentially spaced about the compressor rotor, and (b) a stator shroud assembly including a stator shroud casing surrounding the compressor rotor shaft assembly, a compressor flow passage being defined between the compressor rotor shaft assembly and the stator shroud casing;
a pressurized air source that generates a flow of pressurized air to be provided to the compressor section; and
a plurality of pressurized airflow nozzles connected with the pressurized air source and that provide the flow of pressurized air into the compressor flow passage as a primary driver source to cause the compressor rotor shaft assembly to rotate during a shutdown phase of the gas turbine engine,
wherein the compressor rotor shaft assembly defines a pressurized cavity therewithin that is in fluid communication with the pressurized air source, and the plurality of pressurized airflow nozzles being arranged through at least one shaft section of the plurality of shaft sections, the plurality of pressurized airflow nozzles being circumferentially spaced apart and arranged to provide a tangential flow of air therefrom, with respect to a circumferential direction about the compressor rotor shaft assembly, into the compressor flow passage so as to cause the compressor rotor shaft assembly to rotate.

19. The gas turbine engine according to claim 18, wherein the gas turbine engine is mounted in an aircraft, and the pressurized air source is any one of an auxiliary power unit mounted in the aircraft, an air pump mounted in the aircraft, and an air source external to and connected to the aircraft during the shutdown phase of the gas turbine engine.

\* \* \* \* \*